(12) United States Patent
He et al.

(10) Patent No.: US 11,300,242 B2
(45) Date of Patent: Apr. 12, 2022

(54) STACKED-PLATE TYPE MOBILE DEVICE SUPPORT STAND

(71) Applicants: Moft Inc., Rowland Heights, CA (US); Ben-Tien Lin, New Taipei (TW)

(72) Inventors: Jia-Jia He, Rowland Heights, CA (US); Ben-Tien Lin, New Taipei (TW)

(73) Assignees: Moft Inc., Rowland Heights, CA (US); Ben-Tien Lin, New Taipei (TW)

( * ) Notice: Subject to any disclaimer, the term of this patent is extended or adjusted under 35 U.S.C. 154(b) by 66 days.

(21) Appl. No.: 16/872,346

(22) Filed: May 11, 2020

(65) Prior Publication Data

US 2021/0207762 A1 Jul. 8, 2021

(30) Foreign Application Priority Data

Jan. 3, 2020 (CN) .......................... 202010005432.7

(51) Int. Cl.
*A47B 23/04* (2006.01)
*F16M 11/20* (2006.01)
*F16M 11/38* (2006.01)
*A47B 23/00* (2006.01)

(52) U.S. Cl.
CPC ......... *F16M 11/2021* (2013.01); *F16M 11/38* (2013.01); *A47B 23/00* (2013.01); *A47B 23/043* (2013.01)

(58) Field of Classification Search
USPC .... 248/441.1, 444, 447, 448, 454, 455, 456, 248/457, 458, 459, 460; 40/539, 754, 40/755
See application file for complete search history.

(56) References Cited

U.S. PATENT DOCUMENTS

| | | | | |
|---|---|---|---|---|
| 3,410,516 A | * | 11/1968 | Criswell | A47B 23/044 248/459 |
| 4,105,182 A | * | 8/1978 | Jacobson | A47B 23/044 211/42 |
| 4,607,817 A | * | 8/1986 | Aquino | A47B 23/044 206/214 |
| 4,709,895 A | * | 12/1987 | Mardak | A47B 23/044 248/459 |
| 5,413,305 A | * | 5/1995 | Leeb | A47B 23/043 248/450 |
| 5,722,628 A | * | 3/1998 | Menaged | A47B 23/043 211/50 |
| 2008/0230672 A1 | * | 9/2008 | Pachowski | A47B 23/044 248/453 |
| 2016/0338487 A1 | * | 11/2016 | McGrane | B64D 11/0015 |
| 2016/0377220 A1 | * | 12/2016 | Lin | F16M 11/04 248/176.3 |

* cited by examiner

*Primary Examiner* — Alfred J Wujciak
(74) *Attorney, Agent, or Firm* — Rosenberg, Klein & Lee

(57) ABSTRACT

A stacked-plate type mobile device support stand includes a support plate, a mobile device abutting plate and a base plate. The support plate and the mobile device abutting plate have a first longitudinal bent portion therebetween, and the base plate has a stopper plate, and the base plate and the stopper plate have a second longitudinal bent portion therebetween, and the base plate and the mobile device abutting plate have a third longitudinal bent portion therebetween. When the stacked-plate type mobile device support stand is folded, the support plate, the mobile device abutting plate, the base plate and the stopper plate are bent into a stacked-plate form by using the first, second and third longitudinal bent portions.

7 Claims, 15 Drawing Sheets

STACKED-PLATE TYPE MOBILE DEVICE SUPPORT STAND

FIELD OF INVENTION

The present invention relates to a mouse pad, in particular to a mouse pad having a mobile device support stand.

BACKGROUND OF INVENTION

Description of the Related Art

As electronic products are developed rapidly, electronic devices such as smart phones, tablet PCs, keyboards, and notebooks become very popular, and people are used to carry these electronic mobile devices for the purposes of communication, entertainment, and work and these electronic mobile devices facilitate users in the areas of communication, entertainment, work, etc.

However, the conventional support stand of the aforementioned mobile device is usually very complicated and irregular, and thus bringing tremendous inconvenience of repair and maintenance, storage, and carrying. Therefore, it is a main subject for related manufacturers to provide a feasible solution to overcome the aforementioned problems.

SUMMARY OF THE INVENTION

Therefore, it is a primary objective of the invention to provide a stacked-plate type mobile device support stand, wherein when the mobile device support stand is closed, the plates of the mobile device support stand are stacked into a stacked-plate structure to facilitate users' storage and carrying, and when the stacked-plate type mobile device support stand is opened, the stand can be bent and folded into a mobile device support stand with different inclinations, and when the stacked-plate type mobile device support stand is opened, the stand can be bent and folded to place an external mobile device horizontally and increase the height for placing the external mobile device.

To achieve the aforementioned and other objectives, the present invention discloses a stacked-plate type mobile device support stand comprising a support plate, a mobile device abutting plate and a base plate, wherein the support plate and the mobile device abutting plate have a first longitudinal bent portion therebetween; the base plate has a stopper plate, and the base plate and the stopper plate have a second longitudinal bent portion therebetween; the base plate and the mobile device abutting plate have a third longitudinal bent portion therebetween. When the stacked-plate type mobile device support stand is closed, the support plate, the mobile device abutting plate, the base plate and the stopper plate are bent, folded, and stacked into a stacked-plate form by using the first, second and third longitudinal bent portions. When the stacked-plate type mobile device support stand is opened, the stacked-plate type mobile device support stand can be bent and folded into a mobile device support stand with different inclinations. When the stacked-plate type mobile device support stand is opened, the stacked-plate type mobile device support stand can be bent and folded into a flat mobile device and the height for setting the mobile device can be increased.

BRIEF DESCRIPTION OF NUMERALS USED IN THE DRAWINGS

Figure 1:
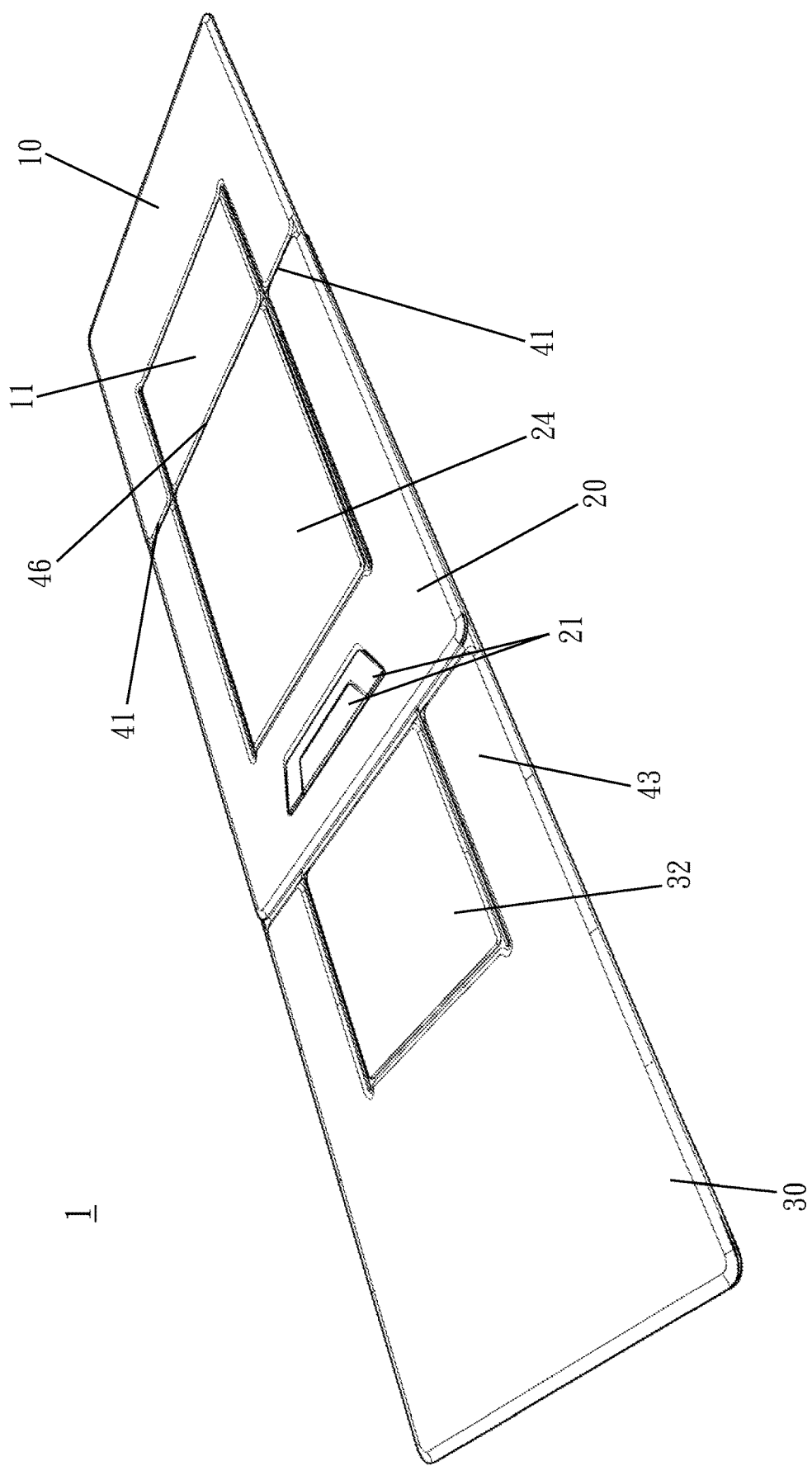
FIG. 1 is a front perspective view of a stacked-plate type mobile device support stand in an unfolded status in accordance with the present invention.
Figure 2:
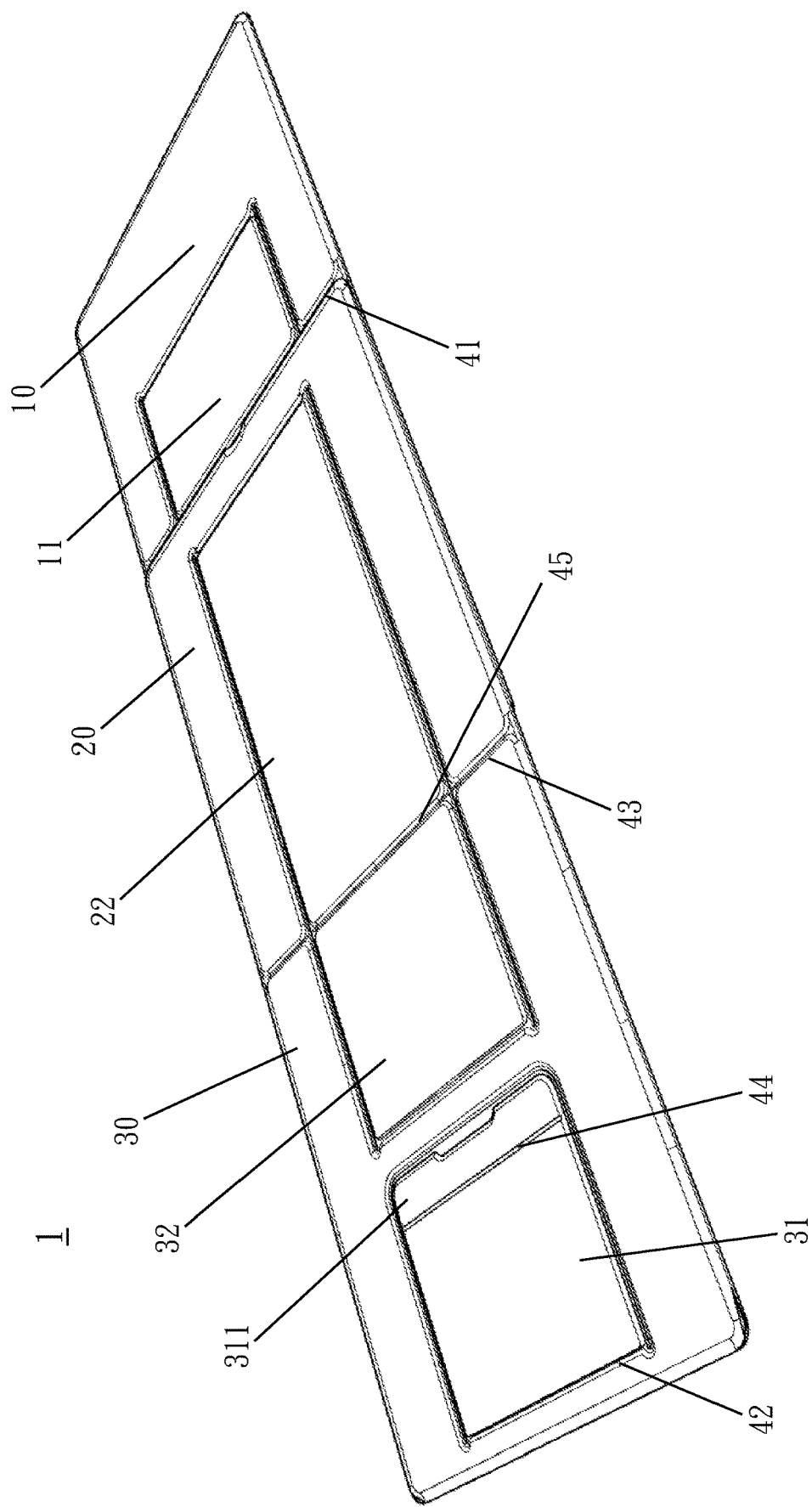
FIG. 2 is a back perspective view of a stacked-plate type mobile device support stand in an unfolded status in accordance with the present invention.
Figure 3:
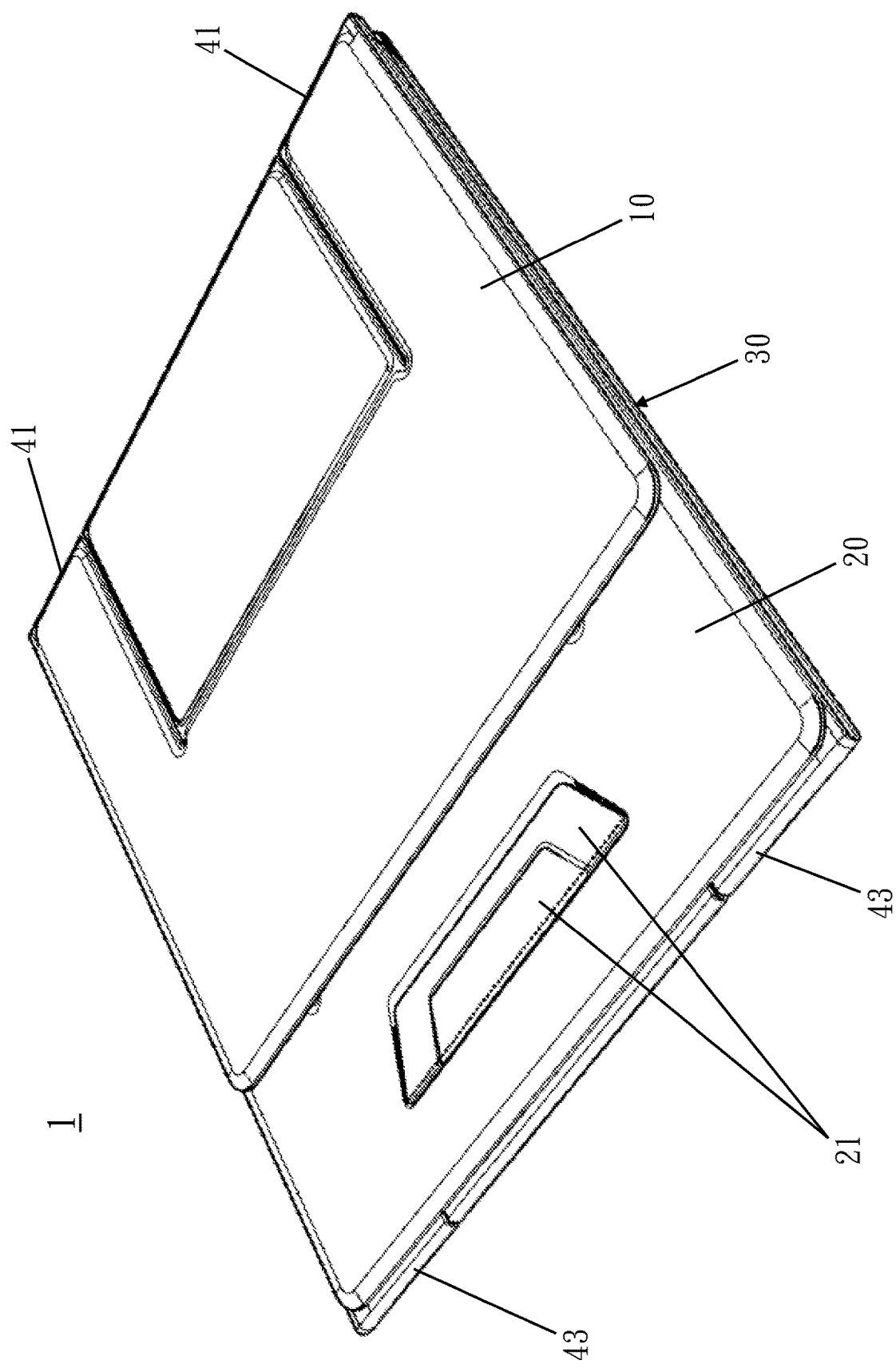
FIG. 3 is a front perspective view of a stacked-plate type mobile device support stand in a folded status in accordance with the present invention.
Figure 4:
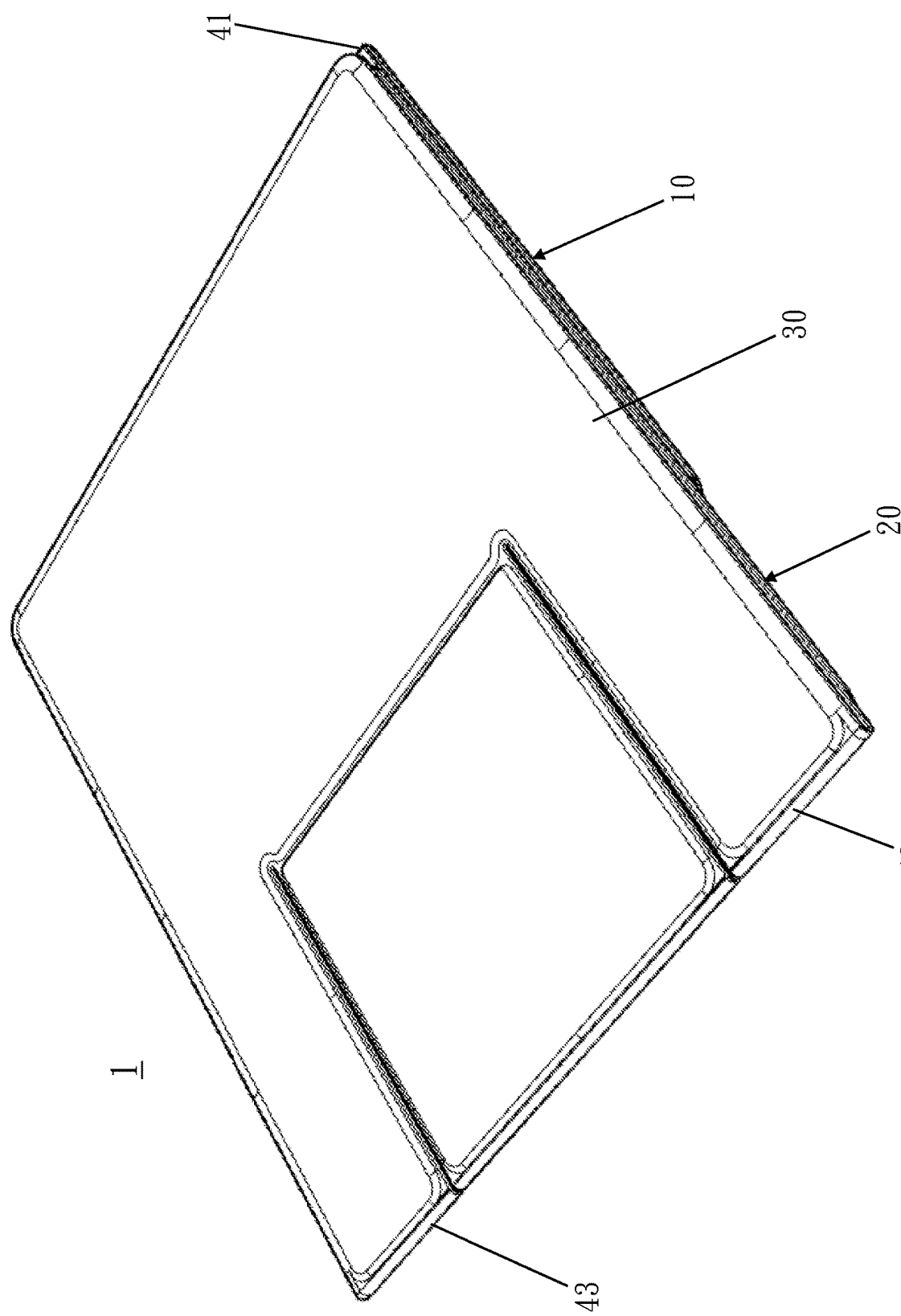
FIG. 4 is a back exploded view of a stacked-plate type mobile device support stand in a folded status in accordance with the present invention.

1: Stacked-plate type mobile device support stand; 10: Support plate; 11: Third link plate; 20: Mobile device abutting plate; 21: Clip; 22: Second link plate; 23: Fourth link plate; 30: Base plate; 31: Stopper plate; 311: Bonded plate; 32: First link plate; 41: First longitudinal bent portion; 42: Second longitudinal bent portion; 43: Third longitudinal bent portion; 44: Fourth longitudinal bent portion; 45: Fifth longitudinal bent portion; and 46: Sixth longitudinal bent portion.

DESCRIPTION OF THE PREFERRED EMBODIMENTS

With reference to FIGS. 1 to 4 for the front and back perspective views of a stacked-plate type mobile device support stand in an unfolded status, and the front and back perspective views of the stacked-plate type mobile device support stand in a folded status in accordance with the present invention respectively, the stacked-plate type mobile device support stand 1 comprises a support plate 10, a mobile device abutting plate 20 and a base plate 30, and the support plate 10 and the mobile device abutting plate 20 have a first longitudinal bent portion 41 therebetween, and the base plate 30 has a stopper plate 31, and the base plate 30 and the stopper plate 31 have a second longitudinal bent portion 42 therebetween, and the base plate 30 and the mobile device abutting plate 20 have a third longitudinal bent portion 43 therebetween, wherein when the stacked-plate type mobile device support stand 1 is closed, the support plate 10 is bent to the mobile device abutting plate 20, and the base plate 30 is bent to the stopper plate 31, and the base plate 30 is bent to the mobile device abutting plate 20 by using the first longitudinal bent portion 41, the third longitudinal bent portion 43 and the second longitudinal bent portion 42 respectively, and then folded and stacked into a stacked-plate form.

Figure 15:
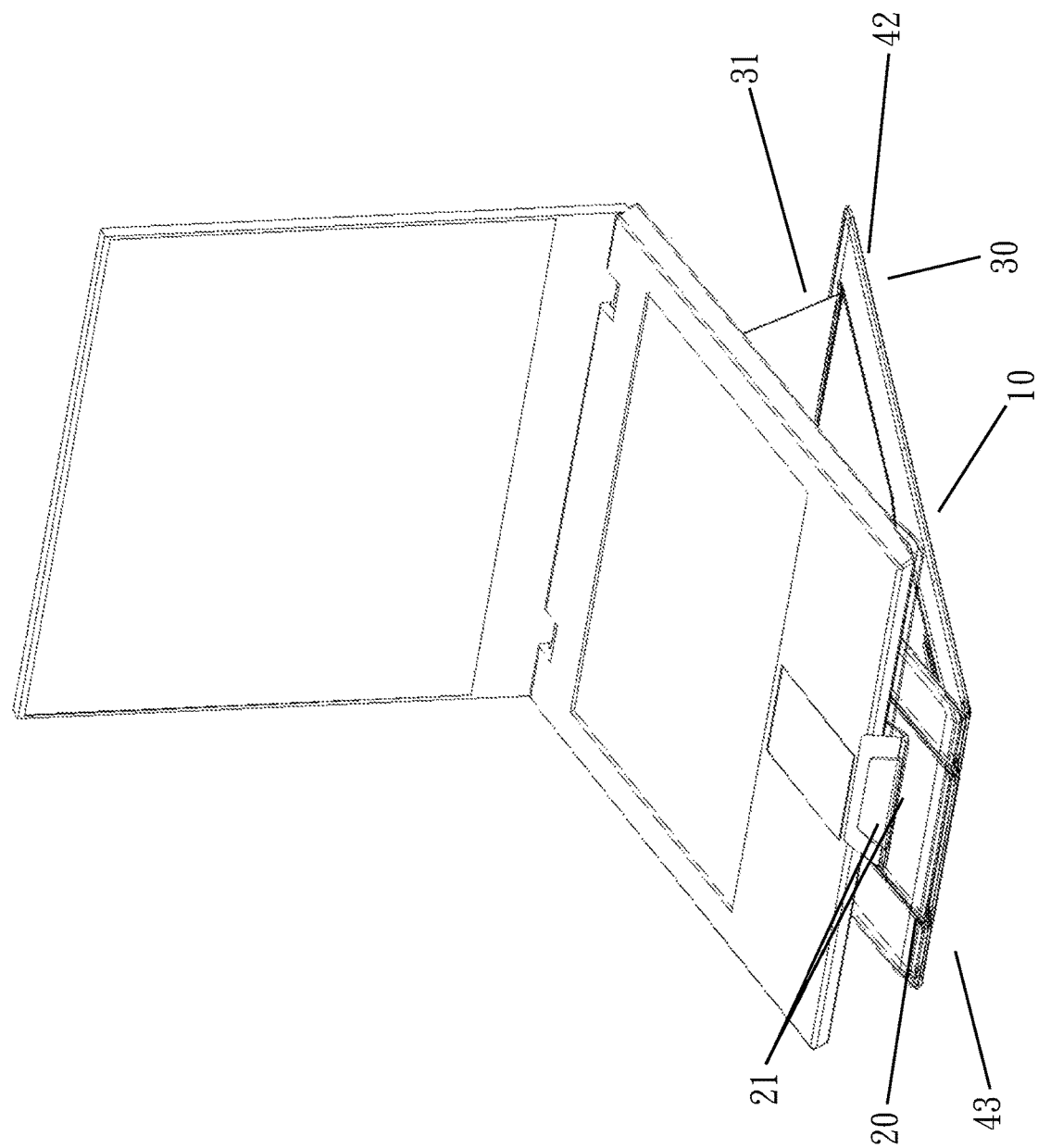
FIG. 15 is a schematic view showing a using status of a stacked-plate type mobile device support stand in an opened status in accordance with the present invention.

Wherein, the mobile device abutting plate 20 has at least one clip 21 for clamping an external mobile device (as shown in FIG. 15). In addition, a part of the support plate 10, the mobile device abutting plate 20 and the base plate 30 has a magnet.

Figure 5:
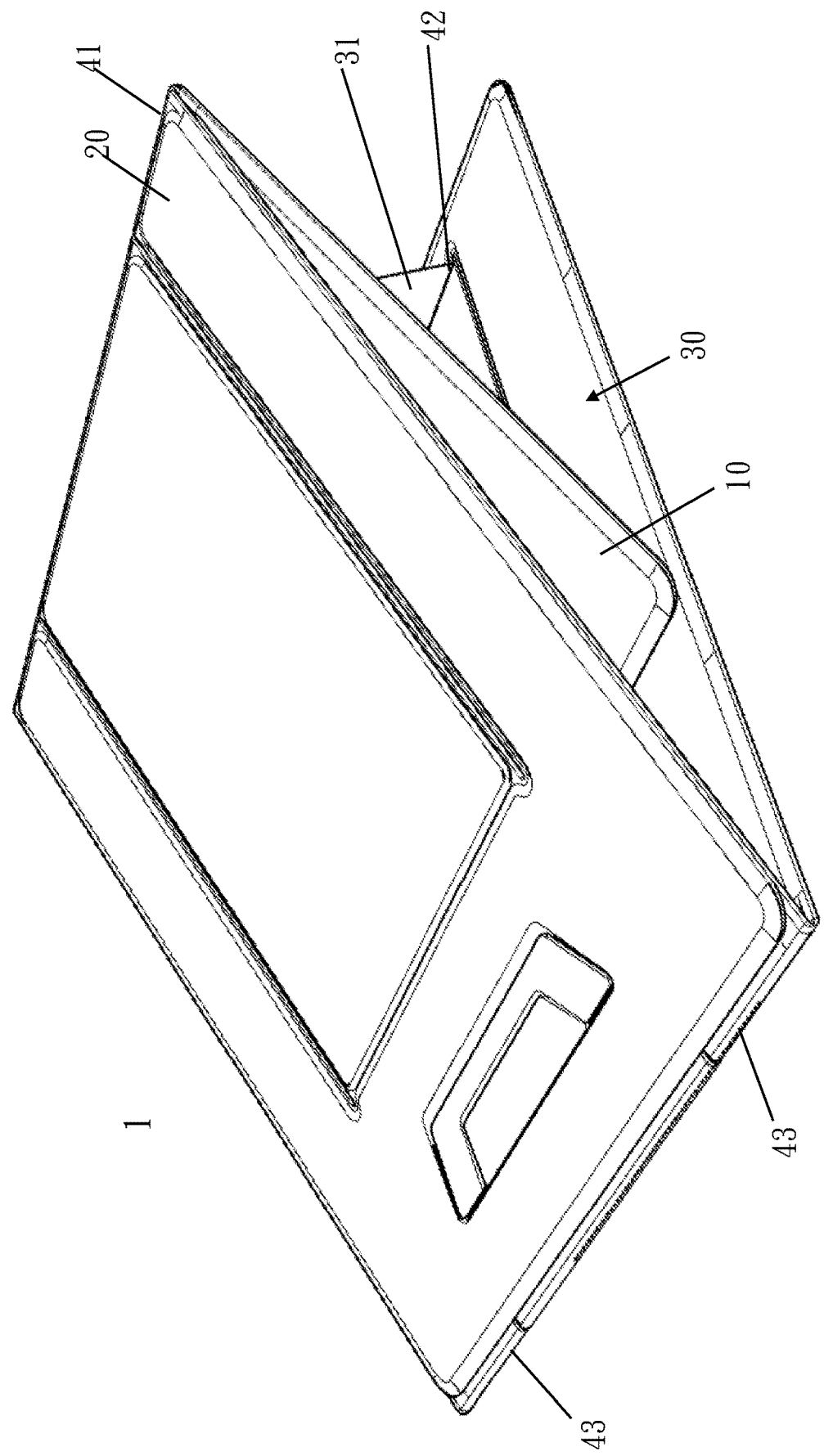
FIG. 5 is a front perspective view of a stacked-plate type mobile device support stand in an opened status in accordance with a first embodiment of the present invention.
Figure 6:
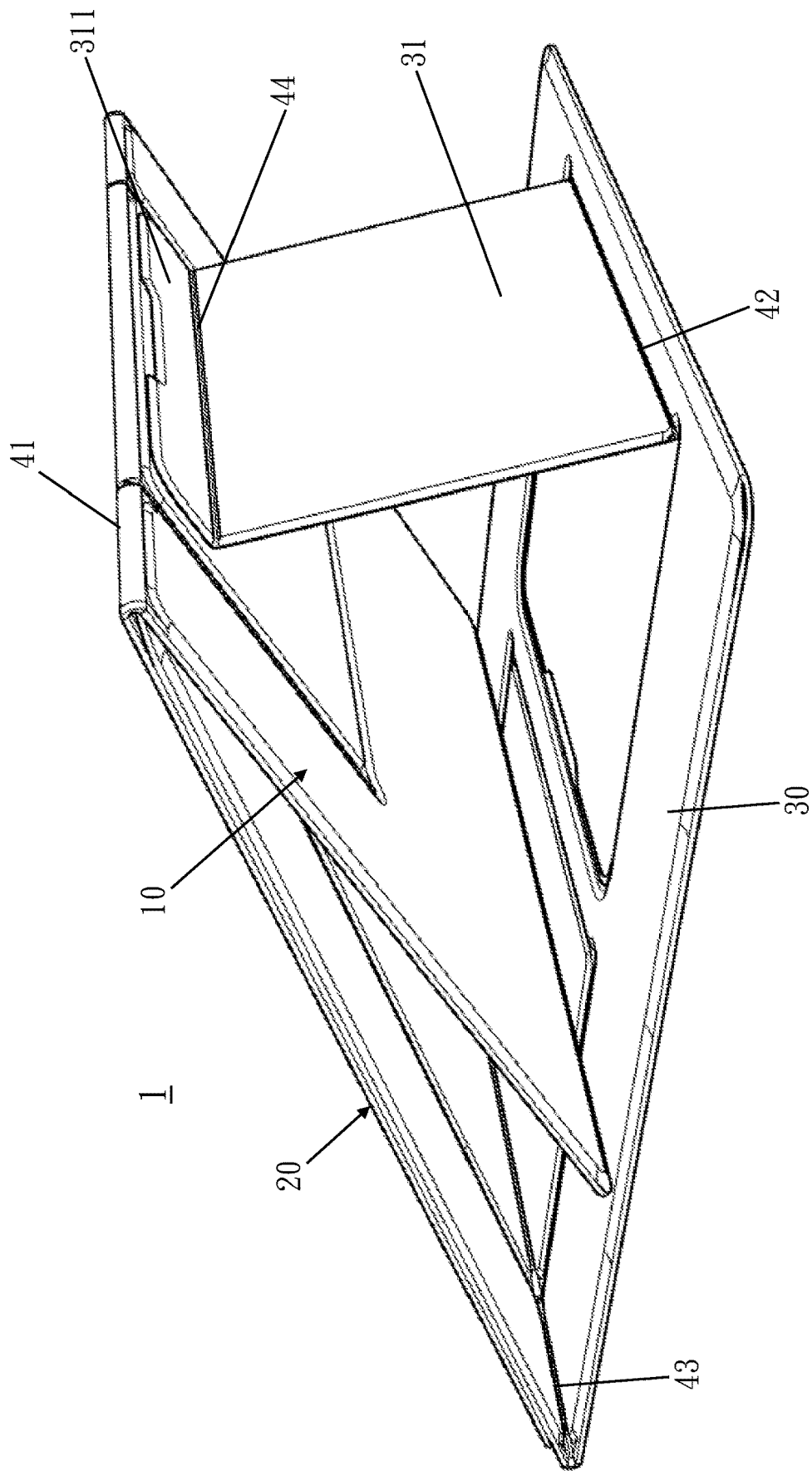
FIG. 6 is a back perspective view of a stacked-plate type mobile device support stand in an opened status in accordance with the first embodiment of the present invention.

With reference to FIGS. 5 and 6 for the front and back perspective views of a stacked-plate type mobile device support stand in an opened status in accordance with the first embodiment of the present invention respectively, the present invention discloses a stacked-plate type mobile device support stand 1 in a first triangular mode having an inclined plane of approximately 25 degrees. When the stacked-plate type mobile device support stand 1 is opened, the third longitudinal bent portion 43 is bent to unfold the mobile device abutting plate 20, and the second longitudinal bent portion 42 is bent to unfold the stopper plate 31, and the first longitudinal bent portion 41 is bent to unfold the support plate 10, so that the stopper plate 31 supports the support plate 10, and the support plate 10 jointly supports the mobile device abutting plate 20, so as to form a mobile device support stand in the first triangular mode, and the mobile device abutting plate 20 abuts an external mobile device (as shown in FIG. 15), wherein the mobile device 5 described in this specification may be a notebook, a mobile phone, a tablet PC, a keyboard, etc.

Wherein, the stopper plate 31 further comprises a bonded plate 311 extending therefrom, and the stopper plate 31 and the bonded plate 311 have a fourth longitudinal bent portion 44 therebetween, and the bonded plate 311 is attached to the support plate 10, and a part of the whole of the bonded plate 311 and the support plate 10 can have a magnet.

In addition, the first longitudinal bent portion 41 may not be bent, so that the support plate 10 is not unfolded but remained to be stacked on the mobile device abutting plate 20. The stopper plate 31 supports the mobile device abutting plate 20, so that a part of the mobile device abutting plate 20 or a part of the support plate 10 abuts an external mobile device 5. The stopper plate 31 has a bonded plate 311 extending therefrom, and the bonded plate 311 is attached directly to the mobile device abutting plate 20, and a part of the mobile device abutting plate 20, the stopper plate 31 and the bonded plate 311 has a magnet.

Figure 7:
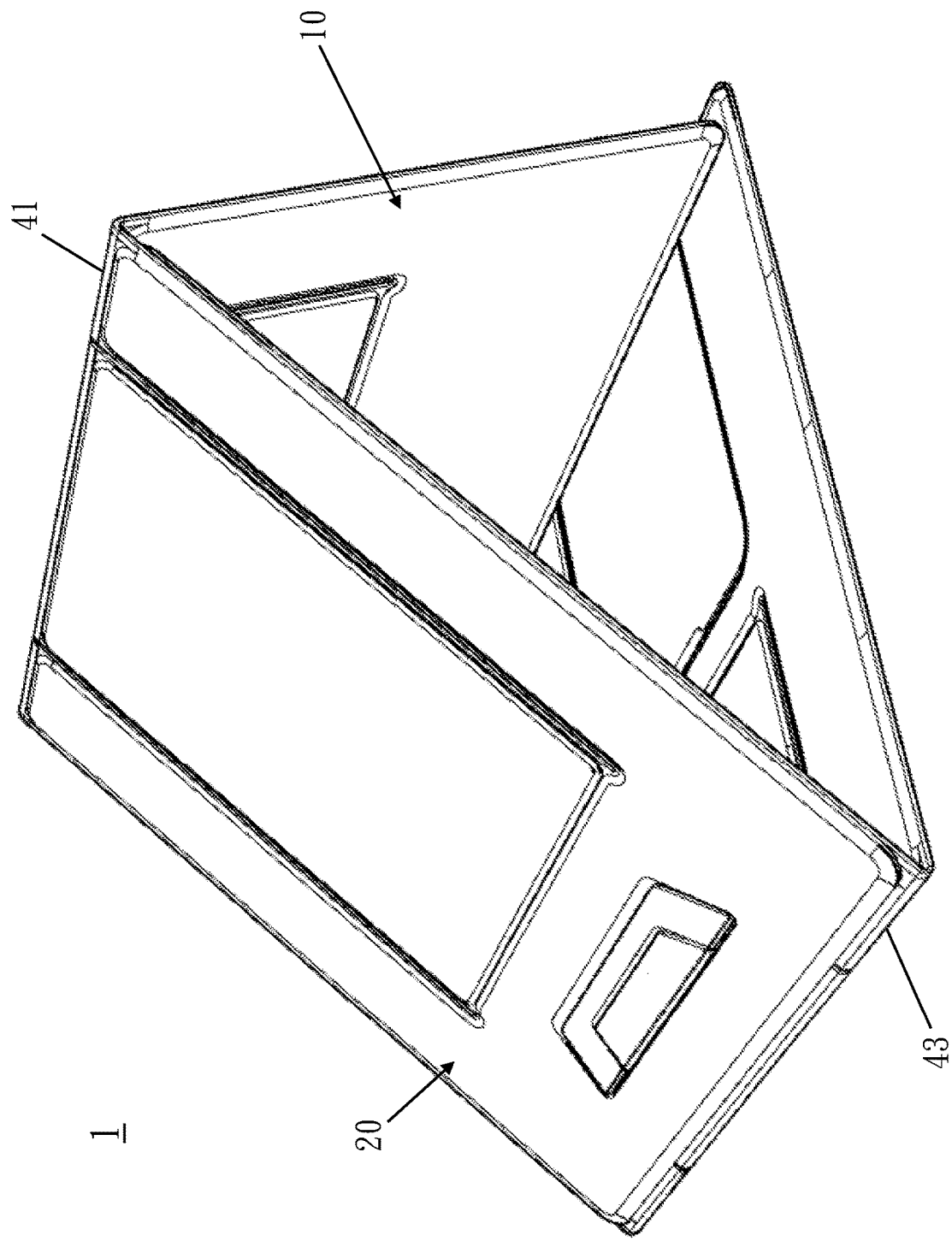
FIG. 7 is a front perspective view of a stacked-plate type mobile device support stand in an opened status in accordance with a second embodiment of the present invention.
Figure 8:
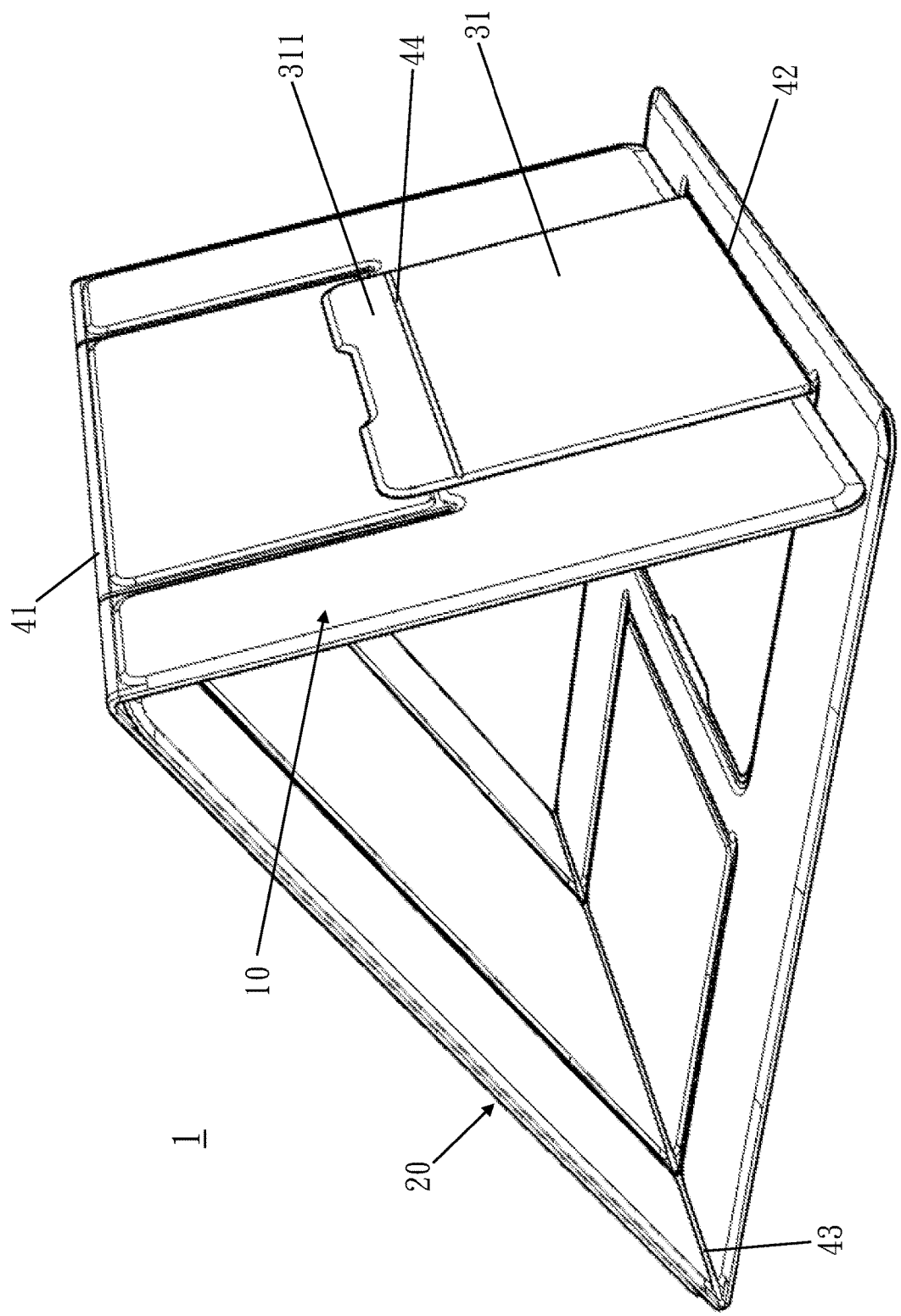
FIG. 8 is a back perspective view of a stacked-plate type mobile device support stand in an opened status in accordance with the second embodiment of the present invention.

With reference to FIGS. 7 and 8 for the front and back perspective views of a stacked-plate type mobile device support stand in an opened status in accordance with the second embodiment of the present invention respectively, the present invention discloses a stacked-plate type mobile device support stand 1 in a second triangular mode having an inclined plane of approximately 45 degrees. When the stacked-plate type mobile device support stand 1 is opened, the first longitudinal bent portion 41 is bent to unfold the support plate 10, and the third longitudinal bent portion 43 is bent to unfold the mobile device abutting plate 20, and the second longitudinal bent portion 42 is bent to unfold the stopper plate 31, and the stopper plate 31 is attached and positioned to the support plate 10, so that the mobile device abutting plate 20 is inclined to abut an external mobile device and form a mobile device support stand in the second triangular mode.

In this embodiment, the stopper plate 31 further comprises a bonded plate 311 extending therefrom, and the stopper plate 31 and the bonded plate 311 have a fourth longitudinal bent portion 44 therebetween, and the bonded plate 311 and the stopper plate 31 are attached to the support plate 10. Wherein, a part or the whole of the stopper plate 31, the bonded plate 311 and the support plate 10 can have a magnet.

Figure 9:
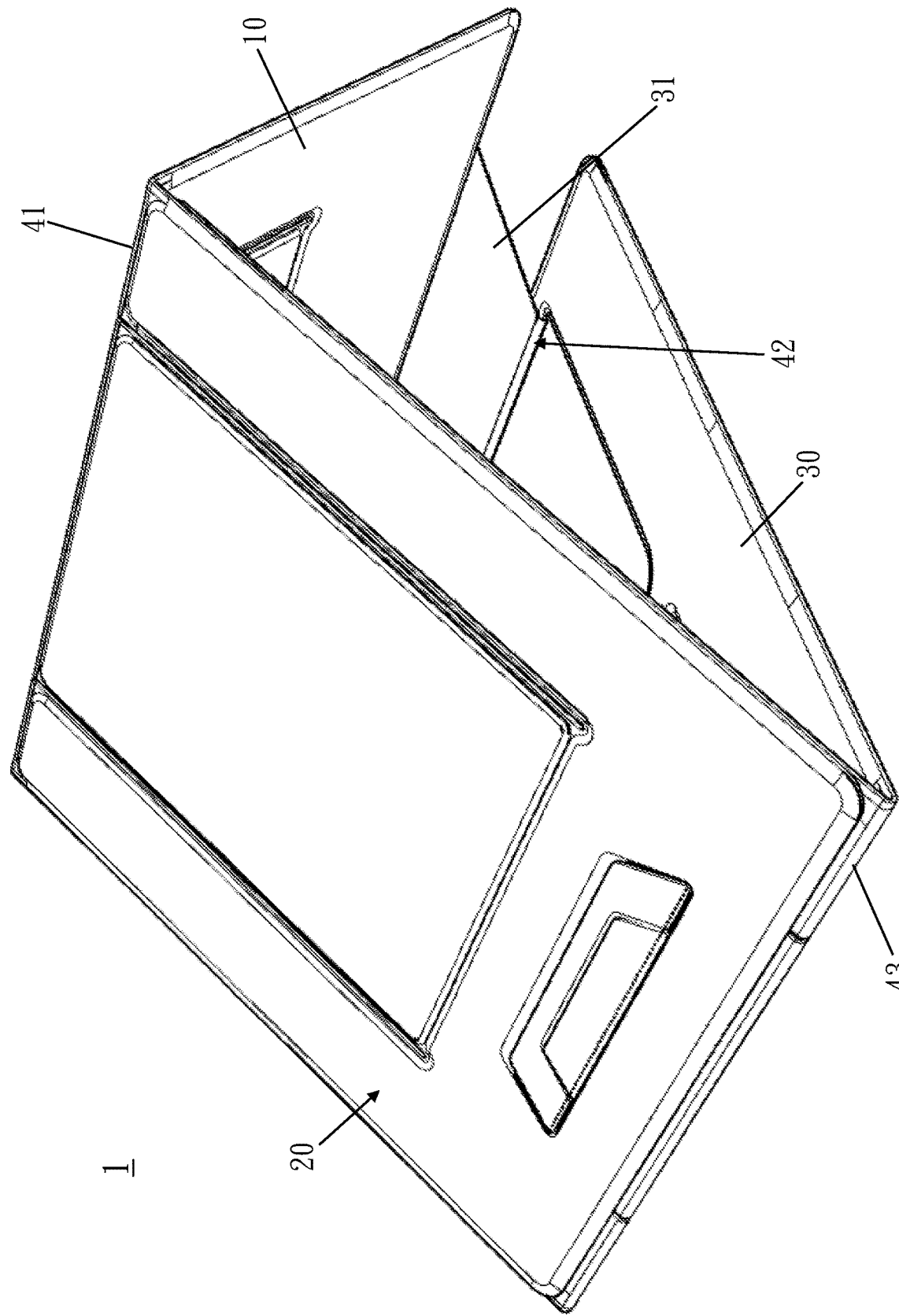
FIG. 9 is a front perspective view of a stacked-plate type mobile device support stand in an opened status in accordance with a third embodiment of the present invention.
Figure 10:
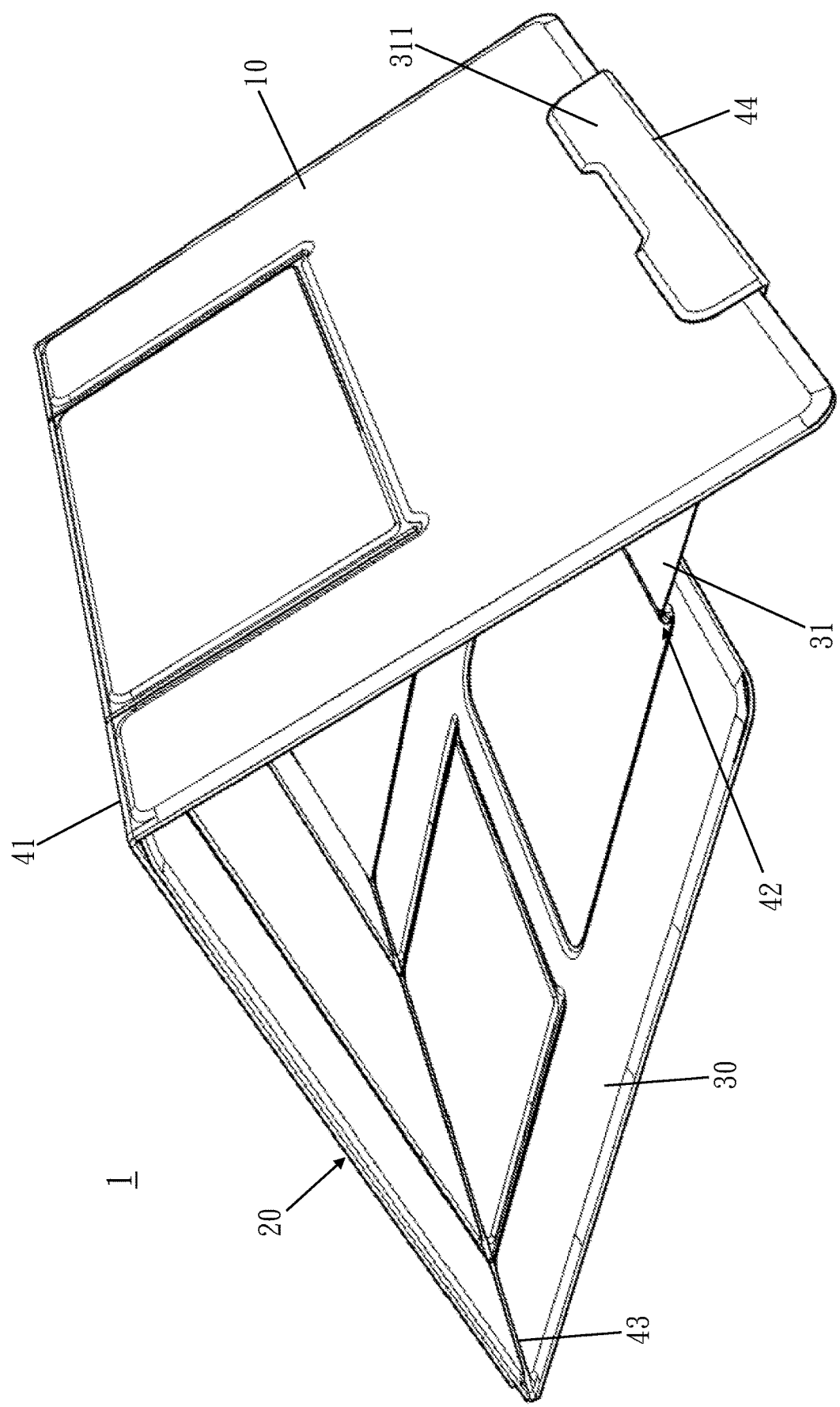
FIG. 10 is a back perspective view of a stacked-plate type mobile device support stand in an opened status in accordance with the third embodiment of the present invention.

With reference to FIGS. 9 and 10 for the front and back perspective views of a stacked-plate type mobile device support stand in an opened status in accordance with the third embodiment of the present invention respectively, the present invention discloses a stacked-plate type mobile device support stand 1 in a third triangular mode having an inclined plane of approximately 35 degrees. The stopper plate 31 further comprises a bonded plate 311 extending therefrom, and the stopper plate 31 and the bonded plate 311 have a fourth longitudinal bent portion 44 therefrom. When the stacked-plate type mobile device support stand 1 is opened, the first longitudinal bent portion 41 is bent to unfold the support plate 10, and the third longitudinal bent portion 43 is bent to unfold the mobile device abutting plate 20, and the second longitudinal bent portion 42 is bent to unfold the stopper plate 31, and the fourth longitudinal bent portion 44 is bent to fold the bonded plate 311, and the bonded plate 311 is attached to the support plate 10, so that the mobile device abutting plate 20 is inclined to abut an external mobile device and form a mobile device support stand in the third triangular mode.

Figure 11:
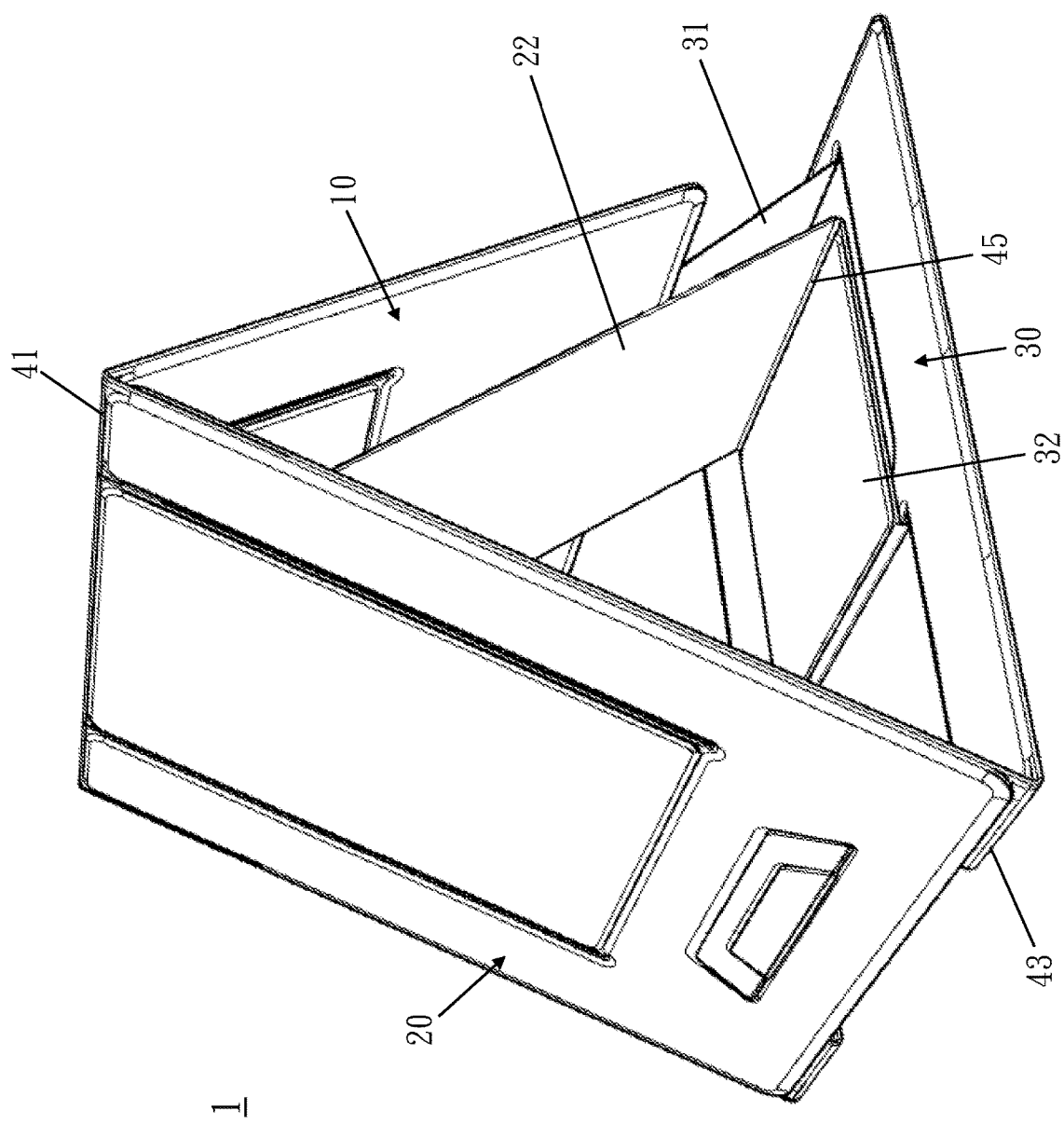
FIG. 11 is a front perspective view of a stacked-plate type mobile device support stand in an opened status in accordance with a fourth embodiment of the present invention.
Figure 12:
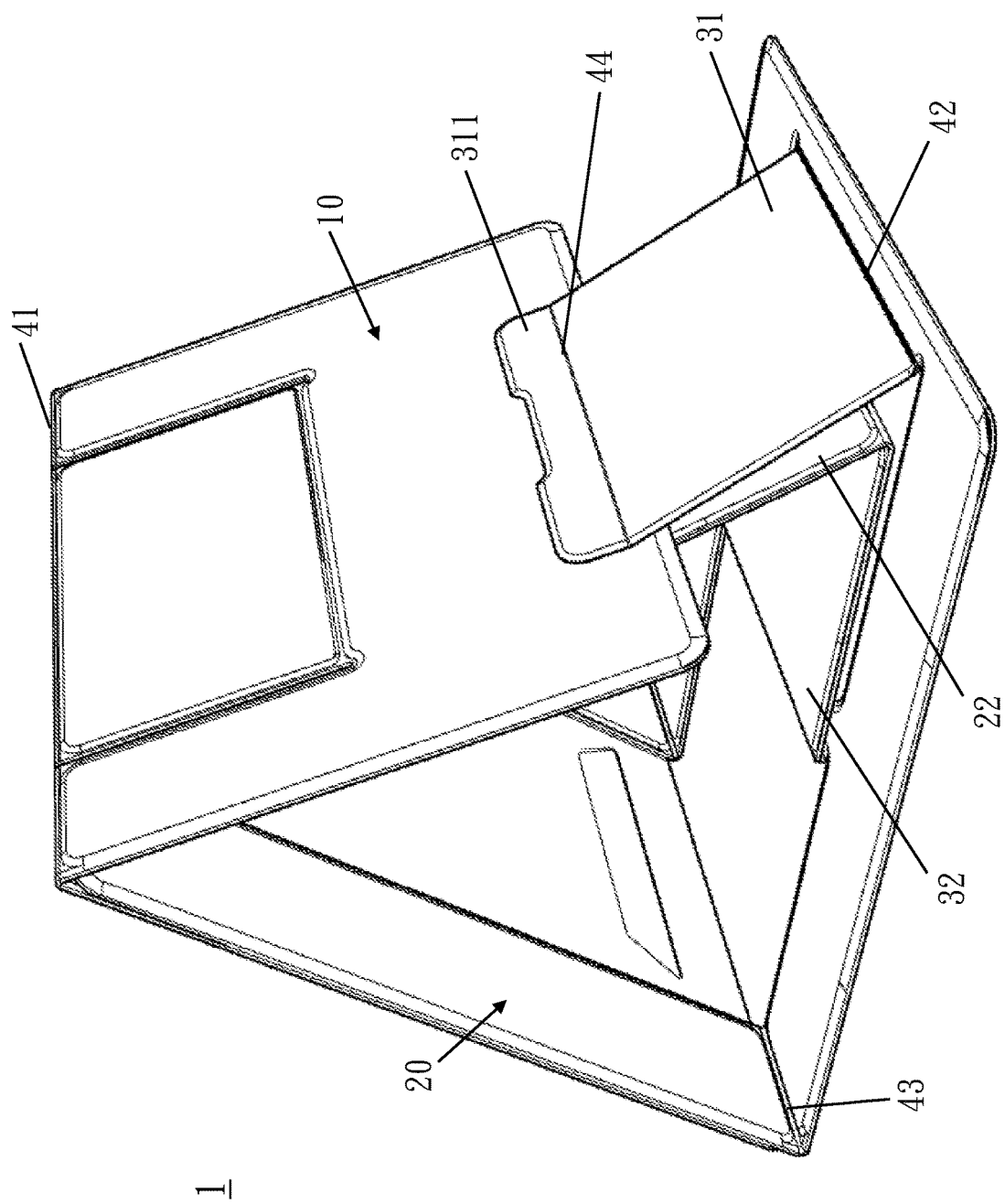
FIG. 12 is a back perspective view of a stacked-plate type mobile device support stand in an opened status in accordance with the fourth embodiment of the present invention.

With reference to FIGS. 11 and 12 for the front and back perspective views of a stacked-plate type mobile device support stand in an opened status in accordance with the fourth embodiment of the present invention respectively, the present invention discloses a stacked-plate type mobile device support stand 1 in a fourth triangular mode having an inclined plane of approximately 60 degrees. The base plate 30 has a first link plate 32, and the mobile device abutting plate 20 has a second link plate 22, and the first link plate 32 and the second link plate 22 have a fifth longitudinal bent portion 45 therebetween. When the stacked-plate type mobile device support stand 1 is opened, the third longitudinal bent portion 43 is bent to unfold the mobile device abutting plate 20, and the fifth longitudinal bent portion 45 is bent to unfold the first link plate 32 and second link plate 22, and the first link plate 32 is attached to the base plate 30, and the second link plate 22 supports the mobile device abutting plate 20, so that the mobile device abutting plate 20 is inclined to abut an external mobile device and form a mobile device support stand in a fourth triangular mode.

In this embodiment, the first longitudinal bent portion 41 is bent to unfold the support plate 10 and abutted against the second link plate 22 to facilitate the mobile device abutting plate 20 to place the external mobile device horizontally. In addition, the stopper plate 31 further comprises a bonded plate 311 extending therefrom, and the stopper plate 31 and the bonded plate 311 have a fourth longitudinal bent portion 44 therebetween, and the second longitudinal bent portion 44 may be bent slightly to attach the bonded plate 311 to the support plate 10. Wherein, a part or the whole of the stopper plate 31, the bonded plate 311 and the support plate 10 can have a magnet.

Figure 13:
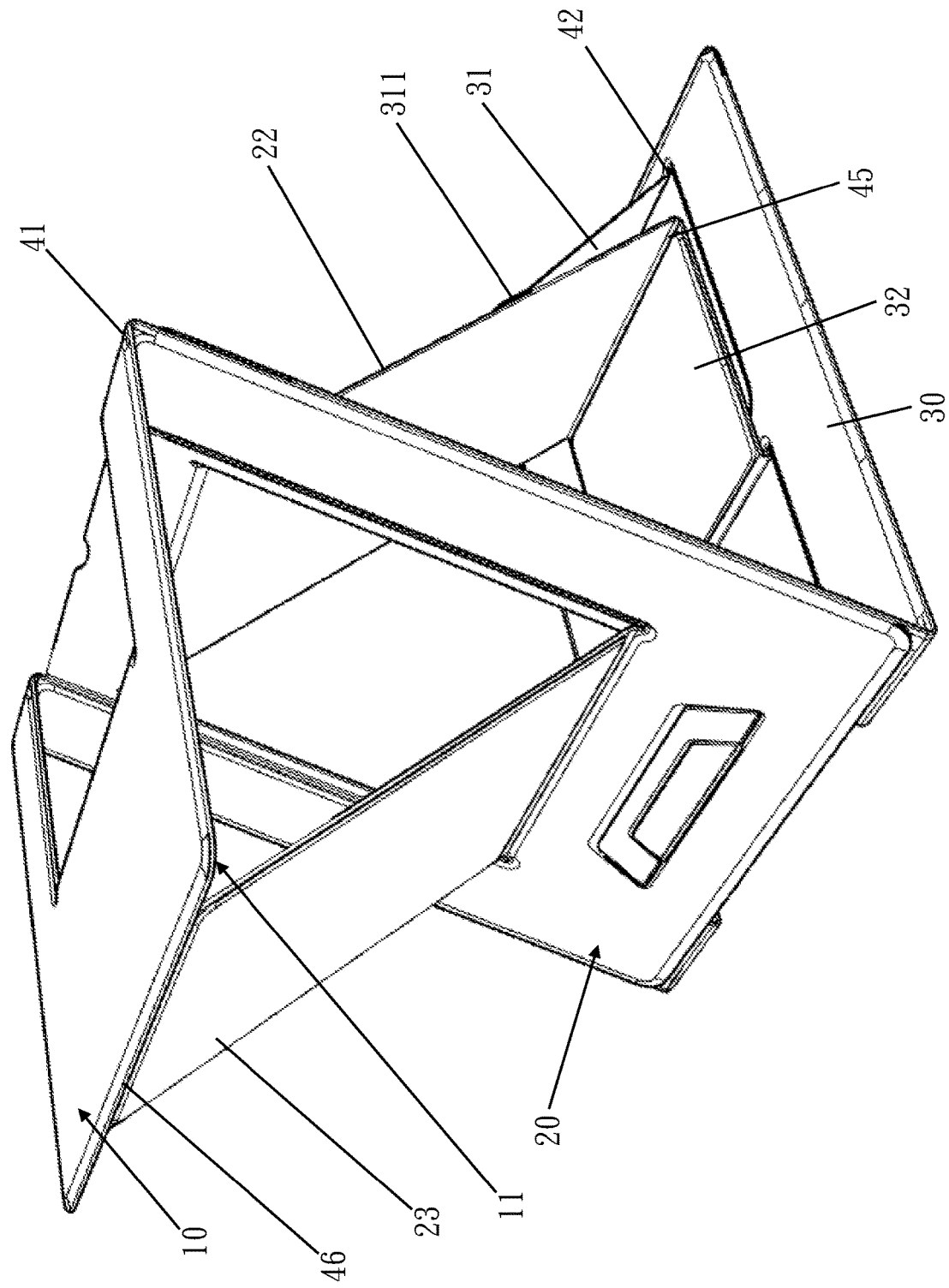
FIG. 13 is a front perspective view of a stacked-plate type mobile device support stand in an opened status in accordance with a fifth embodiment of the present invention.
Figure 14:
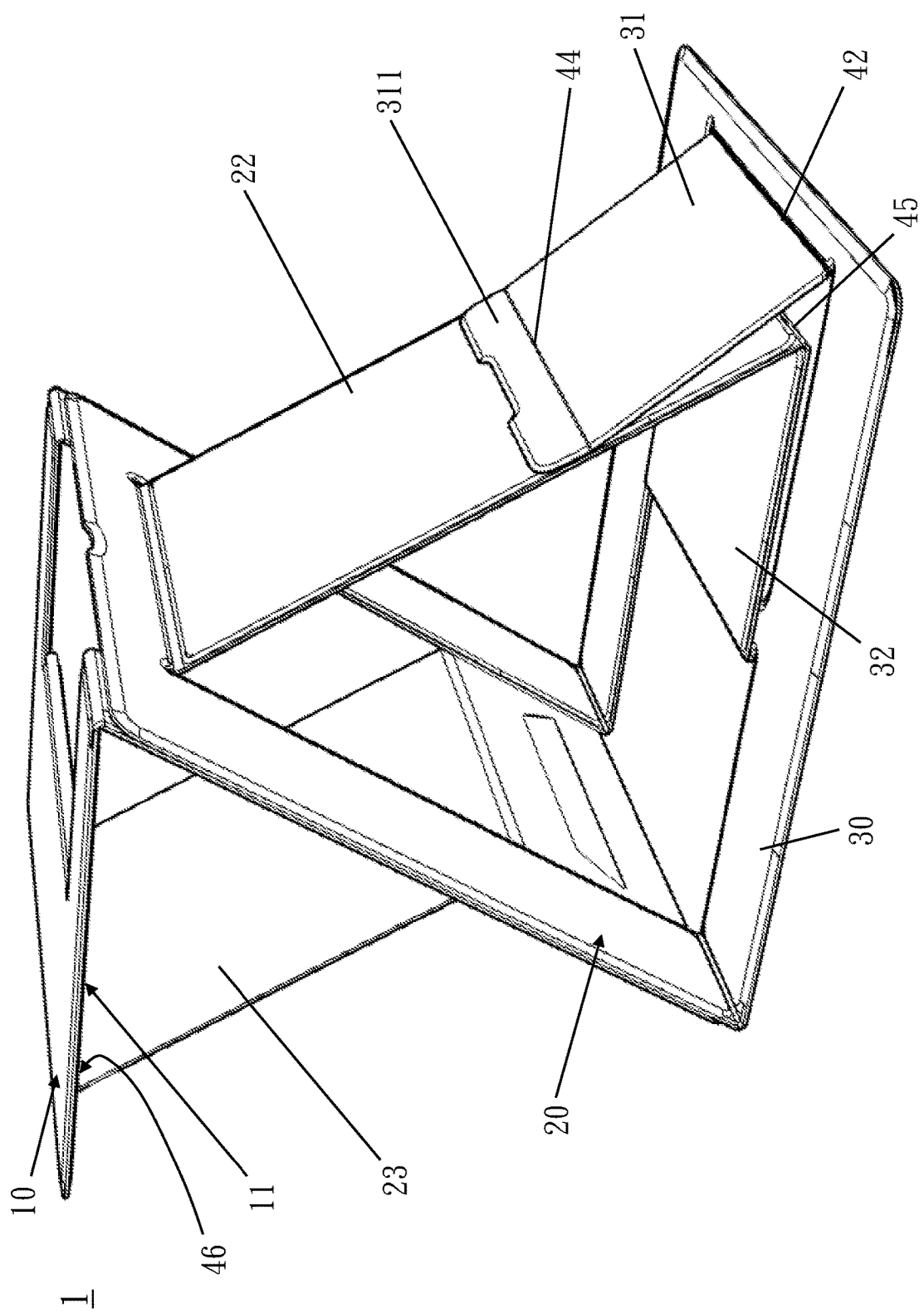
FIG. 14 is a back perspective view of a stacked-plate type mobile device support stand in an opened status in accordance with the fifth embodiment of the present invention.

With reference to FIGS. 13 and 14 for the front and back perspective views of a stacked-plate type mobile device support stand in an opened status in accordance with the second embodiment of the present invention respectively, the present invention discloses a stacked-plate type mobile device support stand 1 in a fifth double-triangular mode capable of placing a mobile device horizontally. Continued from the fourth embodiment above, the support plate 10 has a third link plate 11, and the mobile device abutting plate 20 has a fourth link plate 23, and the third link plate 11 and the fourth link plate 23 have a sixth longitudinal bent portion 46 therebetween. When the stacked-plate type mobile device support stand 1 is opened, the first longitudinal bent portion 41 is bent to unfold the support plate 10, and the sixth longitudinal bent portion 46 is bent to unfold the third link plate 11 and fourth link plate 23, so that the third link plate 11 is attached to the support plate 10, and the fourth link plate 23 supports the support plate 10, so as to achieve the effect of transforming the original mobile device abutting plate 20 into the support plate 10, and the original support plate 10 is transformed to place the mobile device horizontally and increase the height for placing the mobile device. Therefore, the mobile device support stand is formed into a fifth double-triangular mode.

In this embodiment, the stopper plate 31 further comprises a bonded plate 311 extending therefrom, and the stopper plate 31 and the bonded plate 311 have a fourth longitudinal bent portion 44 therebetween, and the second longitudinal bent portion 42 is bent to attach the bonded plate 311 to the second link plate 22. Wherein, a part of the stopper plate 31, the bonded plate 311, and the second link plate 22 has a magnet.

What is claimed is:

1. A stacked-plate type mobile device support stand, comprising:
    a support plate;
    a mobile device abutting plate, and the support plate and the mobile device abutting plate having a first longitudinal bent portion therebetween; and
    a base plate, having a stopper plate, and the base plate and the stopper plate having a second longitudinal bent portion therebetween, and the base plate and the mobile device abutting plate having a third longitudinal bent portion therebetween, wherein when the stacked-plate type mobile device support stand is folded, the support plate is bent to the mobile device abutting plate, the base plate is bent to the stopper plate and the base plate is bent to the mobile device abutting plate by using the first longitudinal bent portion, the third longitudinal bent portion and the second longitudinal bent portion respectively, so that the support plate, the mobile device abutting plate and the base plate can be folded into a stacked-plate form,
    wherein when the stacked-plate type mobile device support stand is opened, the first longitudinal bent portion is bent to unfold the support plate, and the third longitudinal bent portion is bent to unfold the mobile device abutting plate, and the second longitudinal bent portion is bent to unfold the stopper plate, and the stopper plate supports the support plate to form a mobile device support stand in a triangular mode,
    wherein the stopper plate further has a bonded plate extending therefrom, and the stopper plate and the bonded plate having a fourth longitudinal bent portion therebetween, and the bonded plate is attached to the support plate.

2. The stacked-plate type mobile device support stand as claimed in claim 1, wherein the stopper plate further has a bonded plate extending therefrom, and the stopper plate and the bonded plate having a fourth longitudinal bent portion therebetween, and when the stacked-plate type mobile device support stand is opened, the first longitudinal bent portion is bent to unfold the support plate, and the third longitudinal bent portion is bent to unfold the mobile device abutting plate, and the second longitudinal bent portion is bent to unfold the stopper plate, and the fourth longitudinal bent portion to fold the bonded plate, and the bonded plate is attached to the support plate to form a mobile device support stand in a triangular mode.

3. The stacked-plate type mobile device support stand as claimed in claim 1, wherein the base plate has a first link plate, and the mobile device abutting plate has a second link plate, and the first link plate and the second link plate have a fifth longitudinal bent portion therebetween, when the stacked-plate type mobile device support stand is opened, the third longitudinal bent portion is bent to unfold the mobile device abutting plate, and the fifth longitudinal bent portion is bent to unfold the first link plate and the second link plate, and the first link plate is attached to the base plate, and the second link plate supports the mobile device abutting plate to form a mobile device support stand in a triangular mode.

4. The stacked-plate type mobile device support stand as claimed in claim 3, wherein the support plate has a third link plate, and the mobile device abutting plate has a fourth link plate, and the third link plate and the fourth link plate have a sixth longitudinal bent portion therebetween, and when the stacked-plate type mobile device support stand is opened, the first longitudinal bent portion is bent to unfold the support plate, and the sixth longitudinal bent portion is bent to unfold the third link plate and the fourth link plate, and the third link plate is attached to the support plate and the fourth link plate supports the support plate to form a mobile device support stand in a triangular mode.

5. The stacked-plate type mobile device support stand as claimed in claim 1, wherein the mobile device abutting plate has at least one clip provided for clamping an external mobile device.

6. The stacked-plate type mobile device support stand as claimed in claim 1, wherein a part of the support plate, the mobile device abutting plate and the base plate has a magnet.

7. The stacked-plate type mobile device support stand as claimed in claim 1, wherein a part of the stopper plate and the bonded plate has a magnet.

* * * * *